United States Patent [19]

Jackson et al.

[11] 4,069,926
[45] Jan. 24, 1978

[54] BALE COLLECTORS

[75] Inventors: Michael Vivian Jackson, Hethersett; James Kendall Avis, North Lopham, both of England

[73] Assignee: Farmhand (U.K.) Limited, Wymondham, England

[21] Appl. No.: 636,708

[22] Filed: Dec. 1, 1975

[51] Int. Cl.² .................... A01D 87/12; B65G 57/32
[52] U.S. Cl. ........................ 214/6 B; 214/147 R; 294/88; 294/107
[58] Field of Search ........... 214/6 B, 144, 147 R, 214/9; 294/61, 88, 107; 56/473.5, 474, 475, 478, 479

[56] References Cited

U.S. PATENT DOCUMENTS

| 3,000,522 | 9/1961 | Grange | 214/147 R |
|---|---|---|---|
| 3,208,612 | 9/1965 | Blair | 214/144 |
| 3,259,260 | 7/1966 | Blair | 214/147 R |
| 3,809,256 | 5/1974 | Miskin | 214/6 B |
| 3,876,093 | 4/1975 | Carriere | 214/174 R |
| 3,952,881 | 4/1976 | Knudson | 214/6 B |

FOREIGN PATENT DOCUMENTS

| 2,254,361 | 5/1973 | Germany | 214/6 B |
|---|---|---|---|
| 1,020,450 | 2/1966 | United Kingdom | 214/144 |

*Primary Examiner*—L. J. Paperner
*Attorney, Agent, or Firm*—Brisebois & Kruger

[57] ABSTRACT

A loose bale accumulator is disclosed in which bales may be accumulated individually from the ground in a set of side-by-side bale-receiving bays each of which has its individual bale entry point, and means are provided to facilitate entry of bales directly into the respective entry points rather than employing marshalling means interposed between a single entry point and a set of bale-receiving bays.

10 Claims, 5 Drawing Figures

FIG.I.

BALE COLLECTORS

BACKGROUND OF THE INVENTION

FIELD OF THE ART

This invention relates to bale accumulators for agricultural use, and is specifically concerned with loose bale accumulators, by which we mean accumulators which will retrieve individual bales from the ground and accumulate those bales into a regular array for subsequent mechanical handling.

BACKGROUND OF THE INVENTION

STATE OF PRIOR ART

The earliest bale accumulators were designed to be towed behind an agricultural baler and received bales directly from the baler at a single entry point. At first, power operated means were provided to marshall the bales to produce a regular array, and later, systems were devised which used a complex array of deflectors in series, displaced by contact with the bales after their arrival at the entry point, to achieve the same result. Both types of towed accumulator had disadvantages, those with power operation being costly and complex, and those with arrays of deflectors being cumbersome because of the additional length which was required ahead of the bale retaining portion of the machine to accommodate the deflector array.

As well as towed accumulators, there were schemes to pick up bales from the ground using modified accumulators. However, these still received the bales at a single entry point, and the disadvantages of the towed accumulators were inherent in these machines also.

SUMMARY OF THE INVENTION

The object of the present invention is to provide an inexpensive and compact loose bale accumulator which is reliable and efficient in use. A further object of the invention is to provide a combined bale accumulating and loading machine and a related object is to provide an attachment or a kit of parts which can be applied to an existing loader to convert it to dual accumulator/loader use.

The invention basically provides a loose bale accumulator for agricultural application which comprises a plurality of bale-reveiving areas each with its own bale entry point and means, exclusive of laterally movable means, to facilitate entry of bales into the entry points.

DETAILED DESCRIPTION OF THE EMBODIMENTS

Figure 1:
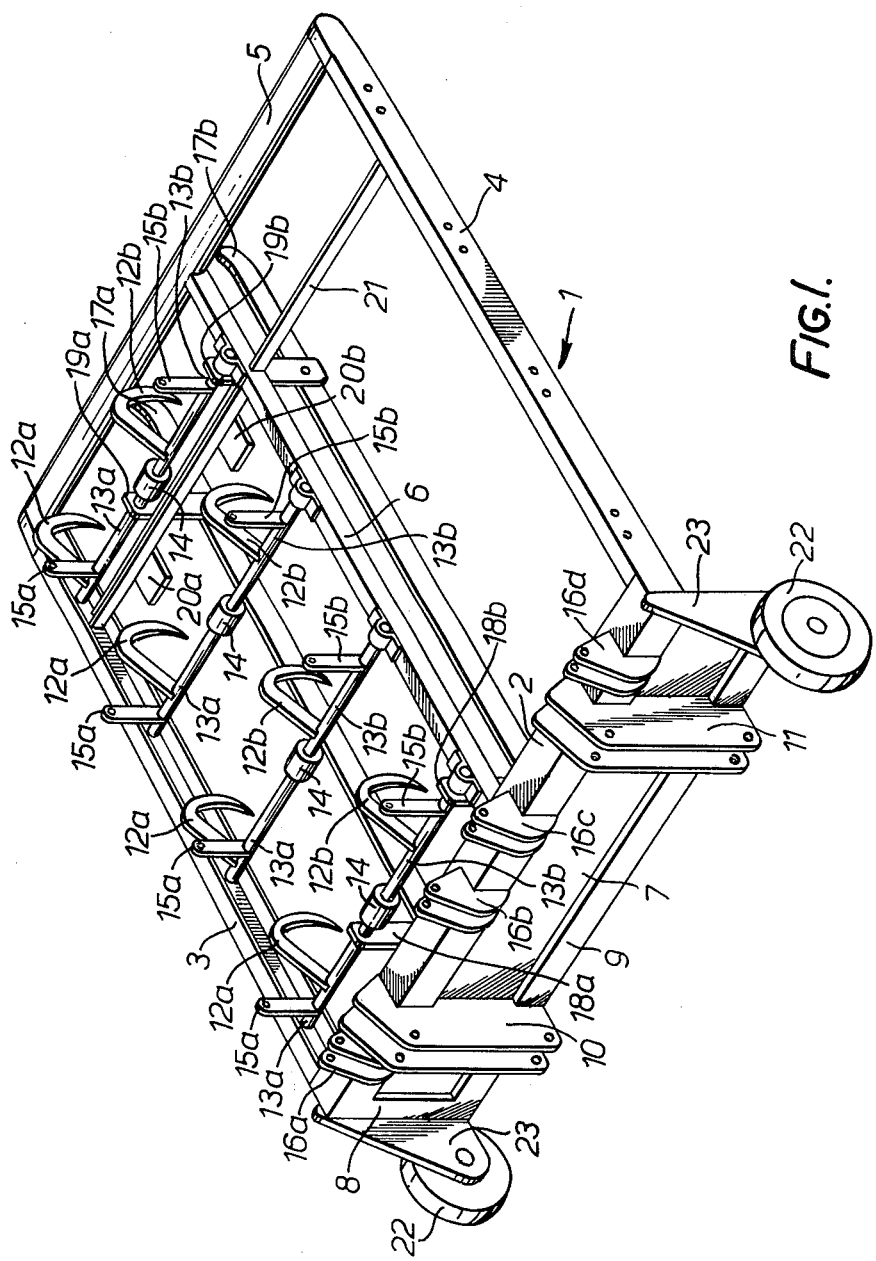
FIG. 1 is a perspective view, with parts removed for clarity, of a first embodiment of the invention applied to a bale loader.

The bale collector illustrated in the drawing is based on a conventional eight-bale bale fork frame 1, having a rear girder 2, side girders 3 and 4, front cross-tube 5, central strut 6, and a depending rear skirt 7 consisting of side members 8 and bottom rail 9. A pair of mounting points 10 and 11 is provided at the rear of the frame 1.

One half of the bale-engaging hook mechanism is shown at the lefthand side of the machine, and represents two sections, so that in all four sections will be provided on complete machines. The hooks 12a and 12b of the respective sections are carried on split shafts 13a, 13b supported between bearings in the side girder 3 and the central strut 6. Each half-shaft 13a carries an elongated collar 14 of enlarged diameter which is drilled to receive and provide a bearing for the end of the corresponding half-shaft 13b. The half-shafts of each section are provided with aligned links 15a, 15b which in use are joined for common movement by a corresponding common link (not shown). Mounting points 16a, 16b 16c and 16d are provided on the rear girder 2 for mounting four hydraulic actuators (not shown) which are connected to cause the common movement of the links of the respective sections of the hook mechanism.

It will thus be understood that the hooks of each section may be separately actuated by the corresponding actuator to descend together to grip and retain bales positioned below them. In addition to causing movement of the hooks, the actuator of a given section is also used to retract a guide rib from its normal position beneath the frame 1, in which it guides the movement of bales beneath the fork. Each of the two sections of the hook mechanism illustrated in the drawing has such a rib. Guide rib 17a is carried on links 18a and 19a which in turn are mounted on the foremost and rearmost half-shafts 13a, and a corresponding guide rib 17b is carried on links 18b and 19b mounted on the two corresponding half-shafts 13b.

The collector, as so far described, can be simply used to collect a pack of eight bales in the following manner. It will be assumed that the left hand side of the frame 1 is provided with a depending skirt (not shown), and at the start of the operation, with all the hooks retracted as shown, the collector, held near ground level on a tractor front end loader, is moved frequently to present the entry point at the forward end of the left hand bale-receiving bay defined between the side skirt and the rib 17a to two bales in suspension. At this point the actuator of the first section is actuated to cause the hooks 12a to penetrate and hold the bales which are caught within the machine by abutment with the rear skirt 7. Simultaneously, the guide rib 17a is raised, and the machine is ready for the collection of two more bales alongside the first two in an analogous manner, after which the actuator of the second section is actuated. In this way, a pack of eight bales can be built up by the machine, and may be off-loaded en block either onto a vehicle or to form part of a stack.

The vertical movement of the guide ribs out of their lower positions serves to facilitate entry of successive bales into the bale-receiving bays provided by the machine.

The operation described above can be manually controlled, but the drawing also illustrates how a degree of automation can be achieved. Each section of the hook mechanism may be provided with a sensor 20a, 20b carried on a transverse angle section 21, just below the level of the frame 1. In normal use the frame engages the ground by means of a pair of ground wheels 22 carried on brackets 23 secured to the opposite ends of the rear frame 7. The attitude of the frame 1 is controlled by the operator to be slightly "nose up", so that the sensors do not contact any bales lying on the ground. When two bales have been collected as described above, the operator returns the attitude of the frame 1 to the horizontal, whereupon the sensor engages the forward bale of the pair and automatically operates the corresponding actuator to cause the pair of bales to be retained. All the actuators are similarly connected, and so the operator merely has to dip the front end of the machine each time two bales have been collected. This arrangement eliminates the need to provide a separate manual control for each actuator, although a common release valve must be provided to release all the actuators when it is required to release a collected pack of bales.

If required, the front cross-tube 5 may be used to support a static guide means in the form of a set of splayed plates providing four entry gates converging from a width of some 1 foot 9 inches at the front to 1 foot 6 inches at the rear. This would further facilitate the entry of bales into the entry points. In order to avoid fouling an adjacent stack of bales, or part of a vehicle, by such a guide means, we envisage that it should be pivoted about the tube 5 and weighted so that by raising the front end of the fork sufficiently, the guide means will drop back into a position above the frame 1.

For convenience in the alternative use of the machine as a normal bale fork, the guide ribs 17a, 17b may be mounted detachably on the cross-shafts.

Figure 2:
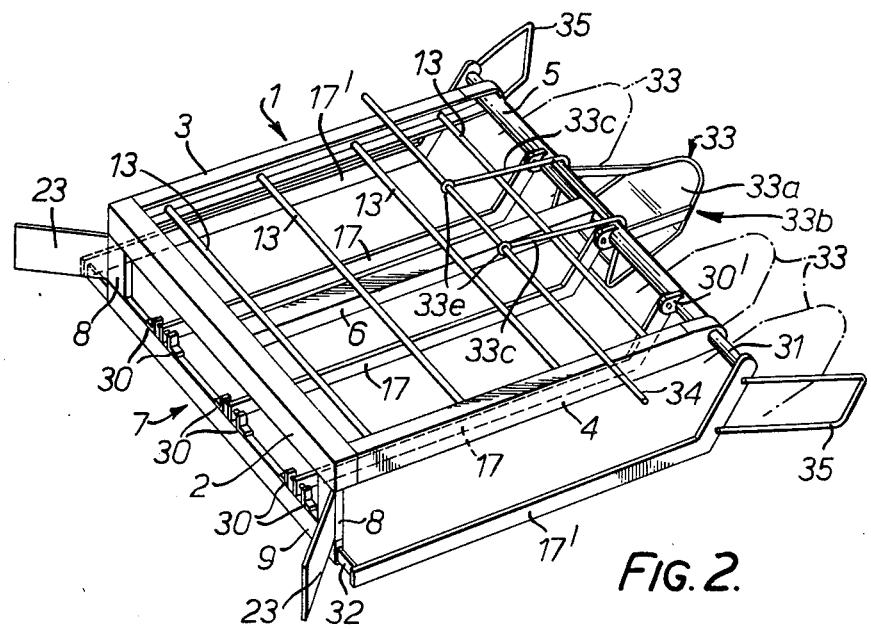
FIG. 2 is a perspective view, with parts removed for clarity, of a second embodiment of the invention, also applied to a bale loader, FIGS. 3 A, B and C, are a side elevation, plan and front elevation of a gate employed in the embodiment of FIG. 2.
Figure 3A:
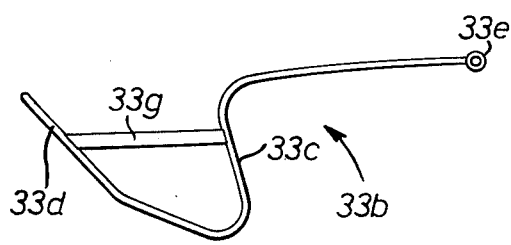
Figure 3C:
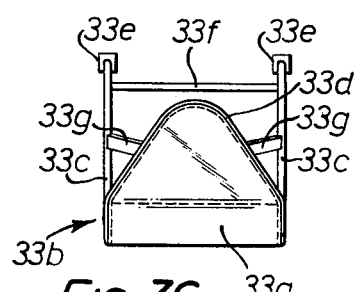
Figure 3B:
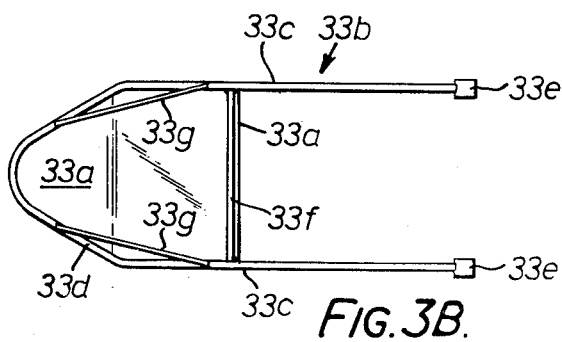

The basic frame of the second accumulator, illustrated in FIG. 2, is similar to that of the machine illustrated in FIG. 1. It consists of a bale fork frame 1 having a rar girder 2, side girders 3 and 4, a front cross-tube 5, a central strut 6 and a depending rear skirt 7 consisting of side members 8 and a bottom rail 9. Four cross shafts 13 are journalled on the side girders 3 and 4 and the central strut 6. The shafts carry bale-engaging hooks (omitted for clarity), and a hydraulic ram (not shown) is coupled to the shafts 13 to cause their simultaneous rotation to impale a group of eight bales in four rows of two extending fore and aft of the frame 1.

The accumulator is divided into four bale-receiving bays by means of ribs 17 and 17'. Three ribs 17 are secured at their front and rear ends respectively to the cross-tube 5 and the bottom rail 9 of the skirt 7. The rear ends are secured between respective pairs of brackets 30 on the bottom rail 9, and the front ends are secured to lugs 30a welded on the cross-tube 5. Each of the ribs 17' carries a stub shaft 31 at its front end and a bar 32 at its rear end, and these engage respectively in the cross-tube 5 and bottom rail 9. Securing pins (not shown) prevent lateral movement between the parts 31 and 32 on the one hand and the frame 1 on the other.

The gates 33 of the present invention are journalled on a transverse shaft 34 secured to the tops of the side girders 3 and 4. One gate is shown in its normal position in FIG. 1, at the front and the second bale-receiving key from the left. The form of the gate 33 is illustrated in FIG. 2. It consists of a shaped metal plate 33a which is carried on a tubular metal framework 33b. The framework 33b is formed by a single piece of metal tube bent into a shape which may be described as a pair of rather flattened S-shaped arms 33c lying in spaced parallel planes and joined by a triangular bight 33d which is inclined upwardly and forwardly slightly more steeply than the lower parts of the "S". The whole framework is symmetrical about a plane located mid-way between the planes of the two arms 33c. The plate 33a follows the curvature of the framework from a point just above the lower curve of the S-shape, forwardly to the tip of the bight.

Bushes 33e are attached to the free ends of the arms 33c, a cross-tube 33f is welded between the arms 33c to stiffen the framework, and struts 33g extend from adjacent the top of each "S" to the corresponding edge of the bight. Referring now to FIG. 1, it will be seen that the bushes 33e engage on the shaft 34, and that the upper curve of the S-shape of each arm 33c engages over the front cross-tube 5 of the machine. Splayed static guides 35 of tubular metal are welded to the forward ends of the ribs 17'.

It will be understood that in use the accumulator is traversed across the ground by means of the front loader of a tractor, and brackets 23 are indicated diagrammatically for mounting castor wheels (not shown). Alternatively, a roller may be secured to the bottom rail 9 of the skirt 7.

Assuming that the accumulator is moved forwardly with a bale aligned approximately with the left-hand bay, then as the accumulator approaches the bale, contact is established between the under surface of the gate 33 (not shown) at the front of the bay. As the plate 33a is upwardly inclined, it will ride over the bale, allowing the latter to pass into the bay as the accumulator continues to move forward. During this process, the left-hand guide 35 and the lefthand edge of the gate 33 on the adjacent bay provide a funnel-shaped guide which tends to align the bale with the first bay. When two bales have entered the first bay, the accumulator may be moved forward so that the second bay is generally aligned with the next bale. As before, the gate 33 at the front of the bay will swing upwardly about the shaft 34, allowing the bale to enter the bay, and this time the oblique sides of the gates 33 on the adjacent bays will form the guide. When the accumulator has been filled in this way, the bale-engaging forks may be actuated to grip all the bales, which may then be stacked on the ground or on a vehicle.

It will be noted that the ribs 17 and 17' may be removed, so that the accumulator can be used as a normal bale fork. As it is customary for a bale fork to have one side shirt, the static guides 35 may be made removable or pivotable if required so that if one rib 17' is retained as a side shirt, the guide will not interfere with the use of the fork. Quick release means (not shown) are used to secure the ribs 17 and 17' to the frame. During use as a bale fork, the gates 33 are pivoted upwardly to lie above the frame 1, and a stop bar (not shown) may be provided above and to the rear of the shaft 34. The outermost two gates may be pivotally mounted about oblique axes if it is required that they do not extend laterally beyond the frame 1.

Obviously the inclination of the plates 33a of the gates 33, seen in the side elevation, and the obliqueness of the sides of the triangular bight 33d will influence the response of the gates in the following two cases, namely, a. the engagement of the plate 33a of a gate as it is brought forward normally into engagement with a bale aligned with the corresponding bay, and b. the engagement of one side of the bight 33d of a gate with a non-aligned bale, to guide the latter into an adjacent bay.

In both cases there is a tendency for the gate to be lifted, but in case (b) the tendency is reduced by a factor depending on the precise angular relationship between the edge of the bight and a vertical corner of the bale. Clearly the weight of the gate and the inclination of the plate 33a and bight 33d must be so chosen that in case (a) the gate is lifted, while in case (b) it is not. Further, since the tendency of the gate to lift in case (b) will increase sharply if a bale is impaled on the edge of the bight 33d rather than being deflected by it, the edge must be contoured so that sliding engagement between the edge and the bale is promoted. Also, the effect of the weight of the gate may be modified by spring loading if required.

It has been found that ease of manufacture can be increased, without loss of operating efficiency, by making the upwardly inclined portion of the plate 33a flat, rather than with the double inclination shown in the drawings. Simplicity of operation can be achieved by providing a simple weighted sector clinometer to show the operator when the frame of the fork is in the optimum, slightly nose-up, position for bale collection.

Both the illustrated embodiments of the invention are combined accumulator/loaders designed to handle a conventional pack of eight bales. It will be understood that the invention is not limited to any particular size of pack, and that machines according to the invention can be designed to handle any desired pattern of bales. Further, although we regard the combined accumulator/loader as the optimum solution of the problem of providing an economical bale-handling system, we also envisage that the invention coulde be used to provide a basic accumulator having no loader function. This proposal can best be understood by considering the machine of FIG. 2 as it appears in the drawing, in which form it could be used on the fore-end loader, or on the side-mounting points, of an agricultural tractor to act as a simple loose-bale accumulator.

Finally, since the invention relates fundamentally to an accumulator, it is not essential that the loader function, when present, be provided by a grapple-hook type of system such as that illustrated in the accompanying drawings. Thus, the loader function may be provided by any convenient means, such as a clamp arm arrangement which compresses the accumulator group of bales sufficiently to enable it to be lifted as an integral block.

We claim:

1. A loose bale accumulator comprising in combination:
   a. structure defining a plurality of bale-receiving areas,
   b. a set of bale entry points, equal in number to the number to bale-receiving areas, at which bales may enter the accumulator,
   c. in association with said bale-receiving areas a set of bale guide members each of which is constructed and adapted to separately execute a vertical component of movement between a guiding and a non-guiding position during an accumulation operation,
   d. a grapple-hook gripping means constructed and adapted to grip an accumulated array of bales for a loading operation, and
   e. sensor means responsive to bale engagement operatively connected to actuate said gripping means, said sensor means being so arranged that in use, when the machine is in an inclination out of the horizontal, said sensor means will not normally engage bales lying on the ground, but when returned to the horizontal it will engage such bales.

2. An accumulator as claimed in claim 1 in which said bale receiving areas are arranged as a set of side-by-side bays.

3. An accumulator as claimed in claim 2 in which said set of bale guide members comprises an arrangement of pivotally mounted members.

4. An accumulator as claimed in claim 3 in which said arrangement ensures that during operation the entry of bales into each of said entry points is effected via an opening appreciably wider than the width of a bale.

5. A loose bale accumulator comprising in combination:
   a. structure defining a set of side-by-side bale-receiving bays,
   b. a set of bale entry points, equal in number to the number of said bays, at which bales may enter the accumulator, and
   c. a set of pivotally mounted gates each of which is mounted at the forward end of a corresponding one of said bays for separate upward pivoting displacement into a non-guiding position about a transverse horizontal axis when engaged by a bale during forward movement of the accumulator over the ground, and is so shaped that in its undisplaced, guiding, position it defines one edge of a funnel-shaped entry to an adjacent bay, the mouth of said funnel being appreciably wider than the width of a bale.

6. An accumulator as claimed in claim 5 in which the outer edge of the entry to each of the outermost of said bale rows is provided by a static guide member.

7. An accumulator as claimed in claim 5 in which each of said gates is formed as a forwardly and upwardly inclined plate.

8. An accumulator as claimed in claim 7 in which said plates are carried on corresponding arms which are pivotally mounted on a transverse axis supported on the upper surface of the accumulator.

9. An accumulator as claimed in claim 5 which includes gripping means for gripping an accumulated array of bales for a loading operation.

10. An accumulator as claimed in claim 9 which includes the gripping means appropriate to a grapple-hook bale fork.

* * * * *